US 7,049,724 B2

(12) United States Patent
Qu et al.

(10) Patent No.: US 7,049,724 B2
(45) Date of Patent: May 23, 2006

(54) SUPERCONDUCTING ROTATING MACHINES WITH STATIONARY FIELD COILS AND AXIAL AIRGAP FLUX

(75) Inventors: Ronghai Qu, Clifton Park, NY (US); James William Bray, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 39 days.

(21) Appl. No.: 10/792,503

(22) Filed: Mar. 3, 2004

(65) Prior Publication Data

US 2005/0194862 A1 Sep. 8, 2005

(51) Int. Cl.
*H02K 1/00* (2006.01)
*H02K 31/00* (2006.01)

(52) U.S. Cl. .................. 310/180; 310/178; 310/254; 310/268

(58) Field of Classification Search ................. 310/54, 310/261, 268, 179, 180, 184, 198
See application file for complete search history.

(56) References Cited

U.S. PATENT DOCUMENTS

| | | | | |
|---|---|---|---|---|
| 4,001,617 A | * | 1/1977 | Boyer | 310/52 |
| 4,031,421 A | * | 6/1977 | Geiger | 310/112 |
| 4,499,392 A | * | 2/1985 | Giacoletto | 310/178 |
| 5,057,726 A | * | 10/1991 | Mole et al. | 310/67 R |
| 5,982,070 A | * | 11/1999 | Caamano | 310/216 |
| 6,100,620 A | * | 8/2000 | Radovsky | 310/268 |
| 6,531,799 B1 | * | 3/2003 | Miller | 310/114 |
| 6,794,783 B1 | * | 9/2004 | Tu et al. | 310/156.32 |
| 6,803,691 B1 | * | 10/2004 | Rose | 310/156.32 |
| 6,809,453 B1 | * | 10/2004 | Narita et al. | 310/216 |

FOREIGN PATENT DOCUMENTS

| | | | |
|---|---|---|---|
| GB | 2087165 | * | 4/1982 |
| GB | 2091950 | * | 8/1982 |
| JP | 64-26341 | * | 1/1989 |
| JP | 1-91642 | * | 4/1989 |
| JP | 3-289344 | * | 12/1991 |
| JP | 11-113241 | * | 10/1997 |

OTHER PUBLICATIONS

Tsao, et al., "A Synchronous Homopolar Machine for High-Speed Applications," *IEEE*, 0-7803-7420-7/02:406-415 (2002).
Aydin, et al., "Performance Evaluation of An Axial Flux Consequent Pole PM Motor Using Finite Element Analysis," *IEEE*, 0-7803-7817-2/03:1682-1687 (2003).
"High-temperature superconducting motors ready for sale", *The Naval Architect*, Jun. 2005, pp. 47-48.

* cited by examiner

*Primary Examiner*—Burton Mullins
(74) *Attorney, Agent, or Firm*—Penny A. Clarke; Patrick K. Patnode

(57) ABSTRACT

A machine, such as a motor or generator, includes a rotatable rotor assembly comprising a plurality of salient poles and a stationary stator assembly comprising a superconducting field coil. The superconducting field coil and the salient poles are configured relative to each other such when the rotor assembly is rotated relative to the stator assembly around a predetermined axis, a rotating magnetic field is produced with an airgap flux direction substantially along the predetermined axis.

23 Claims, 5 Drawing Sheets

SUPERCONDUCTING ROTATING MACHINES WITH STATIONARY FIELD COILS AND AXIAL AIRGAP FLUX

BACKGROUND OF THE INVENTION

The present invention relates generally to electrical motor/generators, and more particularly to machines including superconducting windings.

At least some known superconducting electric machines include a superconducting field coil installed on the rotor. The superconducting coil is maintained at a temperature approaching zero degrees Kelvin using a continuous supply of cryogenic fluid, such as, for example, but not limited to liquid helium ($He_2$). If a high temperature superconductor (HTS) is used in fabricating the field coil, a cryogenic fluid such as nitrogen ($N_2$) may be used to achieve superconducting temperatures. The cryogenic fluid is typically supplied to the superconducting field coil from a stationary cryocooler through a transfer coupling that is coupled to one end of the rotor. The transfer coupling channels the cryogenic fluid from a stationary portion to a rotating portion on the rotor. The cryogenic fluid is then routed through a cooling loop thermally coupled to the superconducting field coil and then back to the transfer coupling for return to the stationary cryocooler.

The superconducting field coil is subjected to thermal stresses, centrifugal stresses, and is provided with an electrical connection through the rotor to power the superconducting field coil. Accordingly, designing, fabricating and operating such a rotor may be difficult. For example, the superconducting coils, especially HTS coils, may be sensitive to mechanical strain. Specifically, because the coils are coupled to the rotor, the coils may be subjected to centrifugal forces that may cause strains and degrade the performance of the superconductor. In addition, because the coil is maintained at a cryogenic temperature, an elaborate support system may be needed to maintain the coil in position against the centrifugal forces while preserving the integrity of the thermal insulation between the coil and the parts of the rotor at ambient temperature.

It is desirable to overcome these shortcomings of the prior art. Further, it is desirable to provide a machine with improved performance characteristics, such as increased torque density.

BRIEF DESCRIPTION OF THE INVENTION

In one aspect, a machine, such as a motor or generator, includes a rotatable rotor assembly comprising a plurality of salient poles and a stationary stator assembly comprising a superconducting field coil. The superconducting field coil and the salient poles are configured relative to each other such when the rotor assembly is rotated relative to the stator assembly around a predetermined axis, a rotating magnetic field is produced with an airgap flux direction substantially along the predetermined axis.

DETAILED DESCRIPTION OF THE INVENTION

Figure 1:
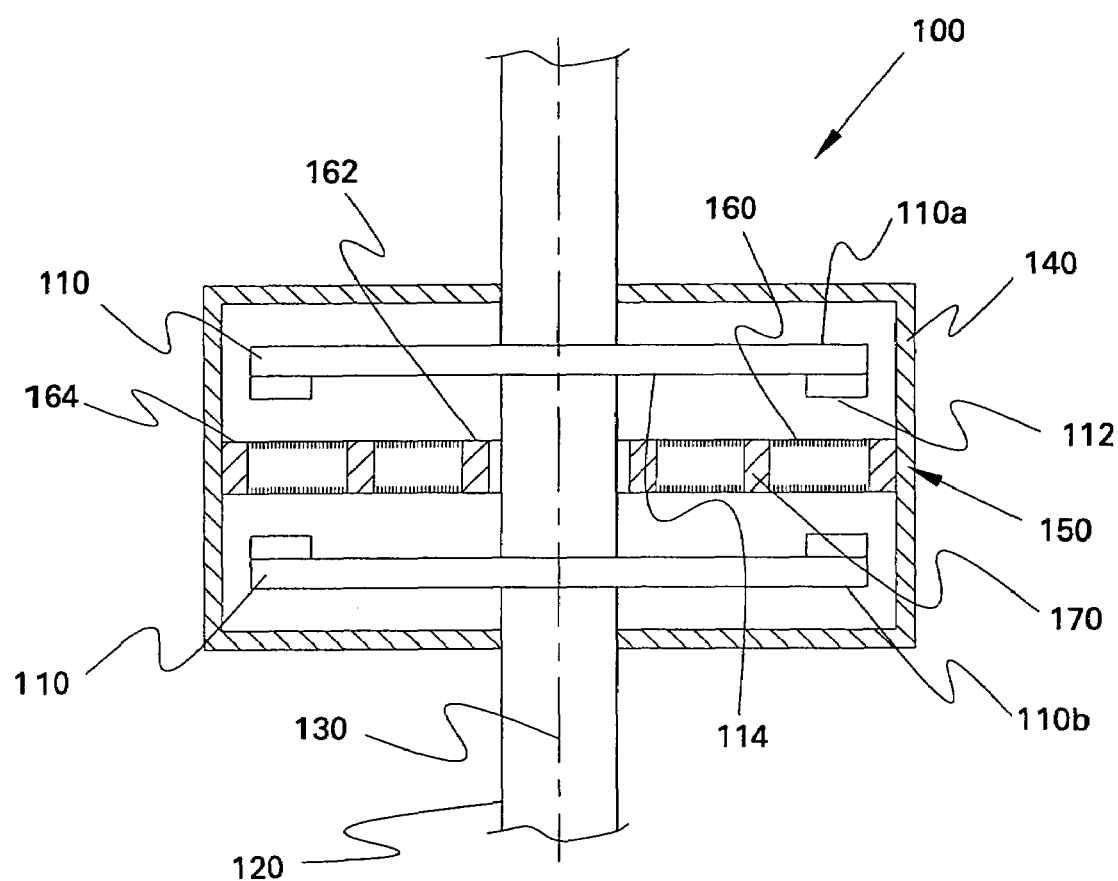
FIG. 1 is a cross-sectional view of an exemplary embodiment of a synchronous machine.

FIG. 1 is a cross-sectional view of an exemplary embodiment of an electrical machine 100. The machine 100 may operate as a motor and/or as a generator as desired. The machine 100 includes a rotor assembly 110 having a pair of rotor segments 110a, 110b mounted on a shaft 120. The shaft 120 is preferably formed of a non-ferromagnetic material, such as stainless steel. The rotor segments 110a, 110b are adapted to rotate as the shaft rotates about its longitudinal axis 130 and are spaced-apart axially along the shaft 120. Each rotor segment 110a, 110b includes a plurality of salient poles, such as iron poles 112 and a plurality of air poles 114. Embodiments of the rotor assembly 110 and rotor segments are described in detail below with reference to FIGS. 4 and 5.

The rotor assembly 110 is substantially enclosed within a stationary housing 140. The housing 140 rotatably supports the rotor assembly 110. The housing 140 is of a substantially cylindrical configuration. A stator assembly 150 is also supported within the housing 140 and is stationary relative to the housing 140. The stator assembly 150 includes a stator 160 having stator windings (not shown) and a stationary field coil 170 preferably made of a superconducting material. Preferably, the field coil 170 is mounted on the stator 160. Embodiments of stator assemblies are described in detail below with reference to FIG. 6.

The field coil 170 is mechanically decoupled from the rotor assembly 110. The field coil 170 is fabricated from a superconducting material such that, when cooled to superconducting temperatures, the field coil 170 exhibits substantially zero resistance to electrical current flow. The field coil 170 and the salient poles 112 are configured relative to each other such that a rotating magnetic field with an substantially axial airgap flux is produced when the rotor segments 110a, 1110b are rotated related relative to the stator 160 around a predetermined axis. In a preferred embodiment where the rotor segments are mounted on the shaft 120, the airgap flux direction is substantially parallel to the axis 130 of the shaft 120.

Thus, the rotor and the stator are offset axially with the field coil being stationary relative to the stator. The poles of the rotor are formed on a planar surface that is substantially perpendicular to the rotational axis of the rotor. Further, the superconducting field coil is positioned in plane that is axially offset from the plane of the poles of the rotor. With the rotation of the rotor through a magnetic field generated by the field coil, a rotating magnetic field is produced. The rotating magnetic field has an airgap flux substantially in the axial direction in the region of the stator.

In operation, the machine 100 may operate as an electrical generator or as a motor. When the machine 100 operates as a generator, the shaft 120 and the rotor assembly 110 are rotated about the longitudinal axis 130 of the shaft 120. The rotation of the shaft 120 and the rotor assembly 110 may be performed by applying a torsional force coupled to the shaft 120. The superconducting coil 170 is cooled to a temperature below its $T_c$ temperature and an electrical current is supplied to the stationary superconducting field coil 170 and the coil 170 acts as a stationary magnetomotive force (MMF) source which interacts with a rotating permeance wave of the rotating poles of the rotor to produce a rotating AC magnetic field. The rotating magnetic field has an airgap flux directed substantially axially along the longitudinal axis 130 of the shaft 120 and is magnetically coupled to the stator windings 160 which allows electrical power to be generated. When the machine 100 operates as a motor, electrical power is provided to the machine 100 to generate the rotating magnetic field and to cause the rotor assembly 110 to rotate relative to the stator 160, which in turn rotates the shaft 120.

In the exemplary embodiment, the field coil 170 is stationary relative to the housing 140, while the rotor assembly 110 rotates relative to the housing 140 such that a relative difference in rotational speed between the rotor assembly 110 and the magnetic field generated by the field coil 170 is the rotational speed of rotor 110.

Figure 2:
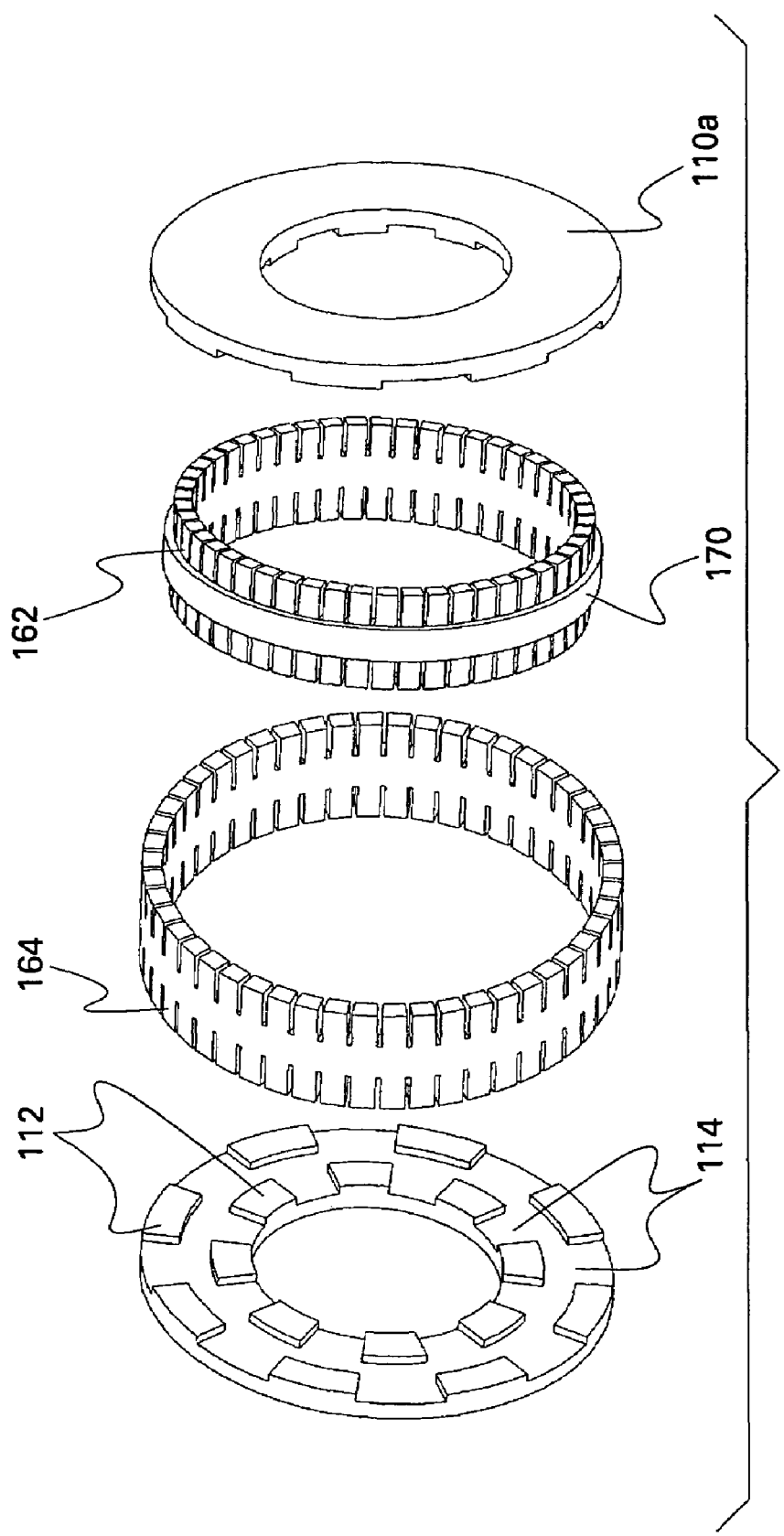
FIG. 2 is a perspective view of a machine according to an exemplary embodiment of the invention.

FIG. 2 illustrates a three dimensional view of the machine 100 according to a preferred embodiment of the present invention where the stator assembly 150 comprises inner 162 and outer stators 164. The superconducting field coil 170 is mounted on a ring shaped inner stator 162. A ring shaped outer stator 164 is located concentrically around the inner stator 162, such that the coil 170 is located between the inner 162 and outer 164 stators. Alternatively, the coil 170 may be mounted on the outer stator 164 or on both the inner and outer stators.

The superconducting coil 170 is maintained at a temperature approaching zero degrees Kelvin using a continuous supply of cryogenic fluid, such as, for example, but not limited to liquid helium ($He_2$). If a high temperature superconductor (HTS) is used in fabricating the field coil, a cryogenic fluid such as nitrogen ($N_2$) may be used to achieve superconducting temperatures. The cryogenic fluid is typically supplied to the superconducting field coil from a stationary cryocooler. Any suitable cooling fluid devices, such as cooling fluid tubes or conduits may be provided in the stator assembly 150 to cool the superconducting coil 170.

The rotor segments 110a and 110b comprising salient poles 112 and air poles 114 are located axially on either side of the stators 162, 164, as shown in FIG. 2. A plurality of such rotor/stator arrangements can be stacked axially along the shaft 120 for long machines. The armature windings are not shown in FIG. 2 for clarity.

Figure 3:
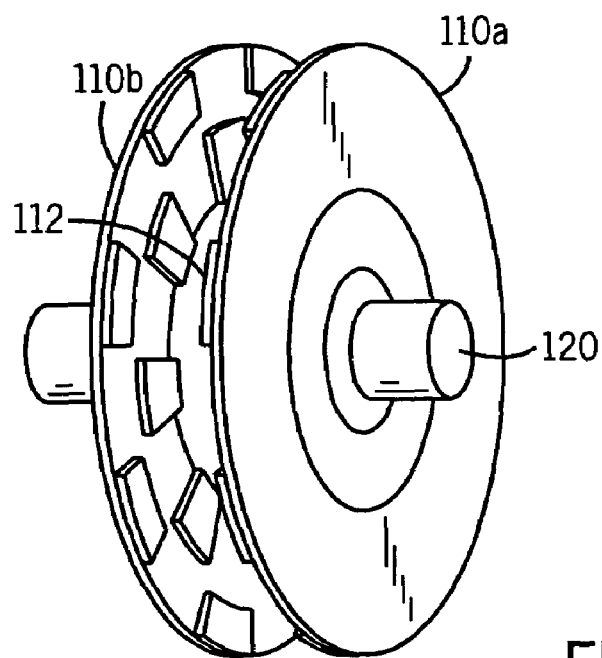
FIG. 3 is a perspective view of an exemplary embodiment of a rotor assembly for the machine shown in FIG. 1.

FIG. 3 illustrates a three dimensional view of the rotor assembly 110 mounted on a shaft 120. Preferably, the rotor assembly contains two rotor segments. As illustrated in FIG. 3, the rotor assembly 110 is formed by placing two similar rotor segments 110a, 110b in an axially spaced-apart configuration. The rotor segments 110a, 110b are sufficiently separated to allow a stator assembly to reside therebetween.

Figure 4:
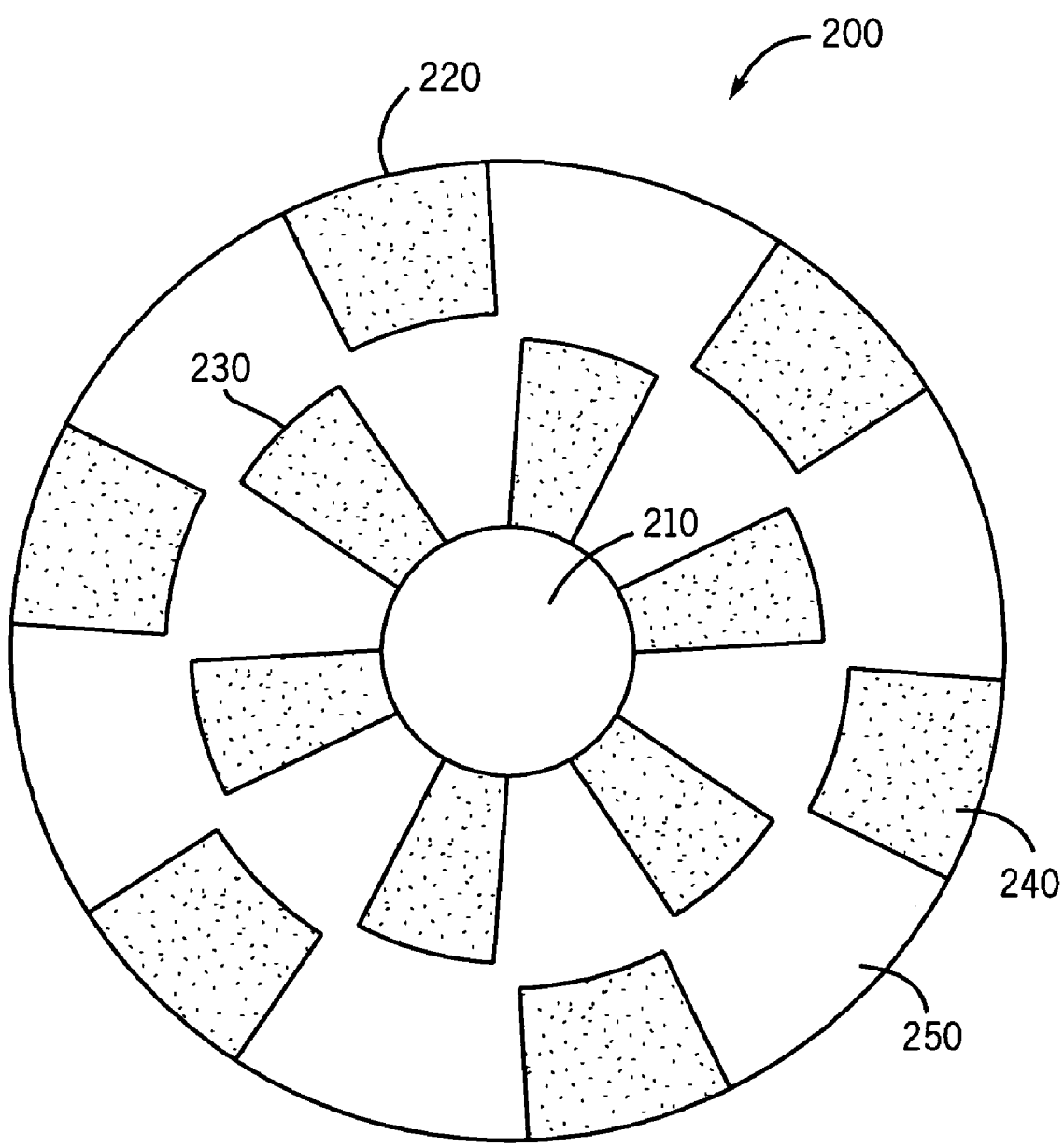
FIG. 4 is a plan view of an exemplary embodiment of a rotor for the machine shown in FIG. 1.

FIG. 4 is a plan view of an exemplary rotor segment 200 that may be used with motor 100 of FIG. 1. The rotor segment 200 includes a central portion 210 for engaging the shaft (see FIG. 1). This central portion 210 may be adapted to accommodate fixtures or adapters which secure the rotor segment 200 to the shaft.

The rotor segment 200 is preferably formed of a disk-shaped base 250 that is divided into one or more concentric rings. Preferably, the base 250 is divided into a plurality of concentric rings, such as two rings 220, 230. In a preferred embodiment, the base 250 is made of a ferromagnetic material to allow flux to travel therewithin. Each ring is provided with a plurality of spaced-apart ferromagnetic poles 240 formed on a surface of the base 250. In a preferred embodiment, the salient ferromagnetic poles 240 are formed with iron plates mounted on the surface of the base 250. In another embodiment, the salient poles 240 are formed of laminated iron. In yet another embodiment, the salient poles 240 and the base 250 are of a unitary construction.

Space between the ferromagnetic poles 240 forms air gaps, or air poles. The ferromagnetic poles 240 in adjacent rings are preferably offset by one pole pitch either within or between the concentric rings. Preferably, the salient poles 240 and the air poles therebetween are either annular sector shaped or trapezoidal shaped. Thus, a plurality of poles is formed in each ring such that the poles are circumferentially spaced apart.

Figure 5:
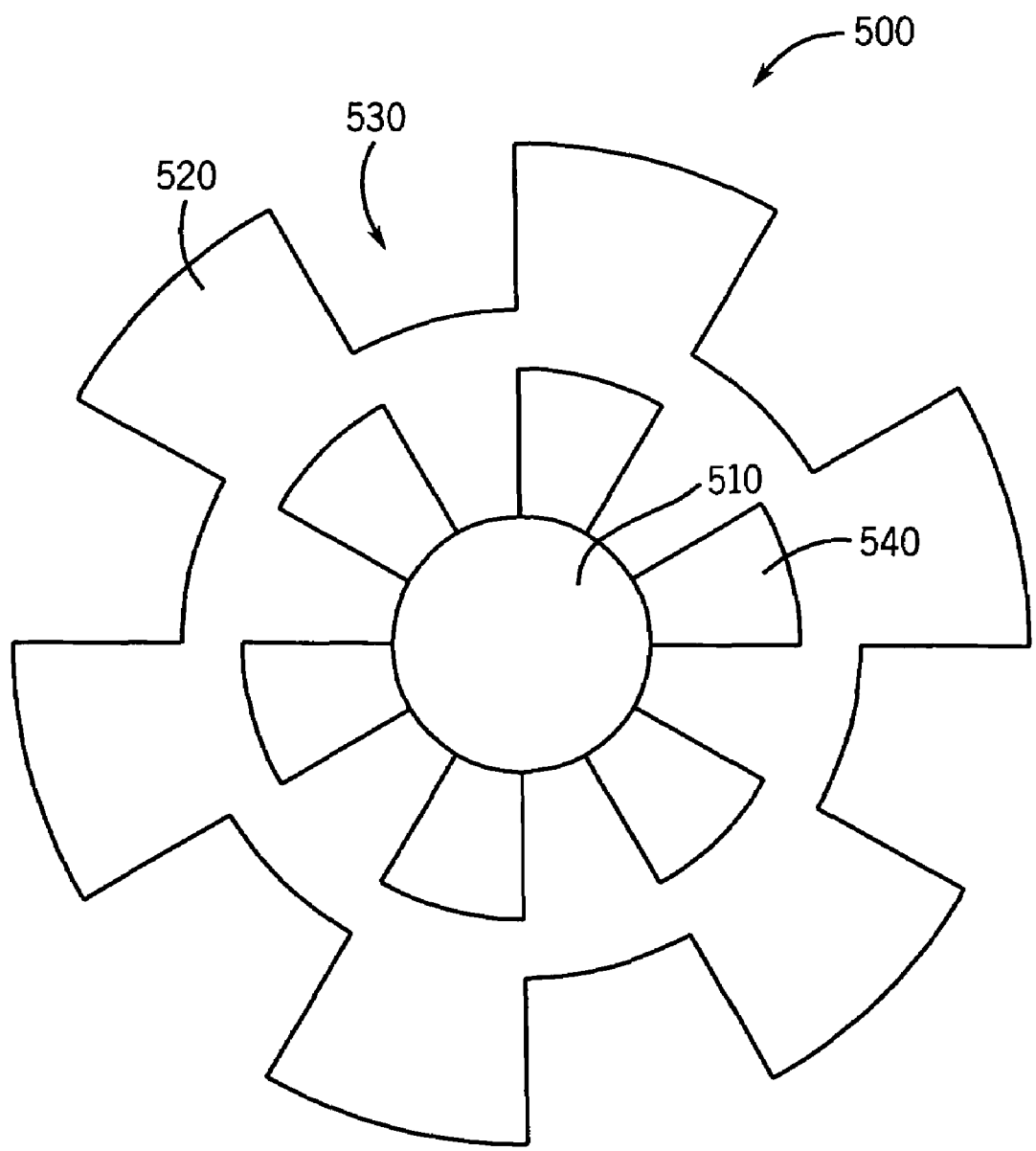
FIG. 5 is a plan view of a second exemplary embodiment of a rotor for the machine shown in FIG. 1.

FIG. 5 illustrates an alternative embodiment of a rotor segment. The rotor segment 500 is formed of a unitary segment 520 made of a ferromagnetic material. The segment 500 is shaped to form a central portion 510 adapted to securely engage the shaft. Further, the rotor segment 500 includes perimeter cutouts 530 and internal cutouts 540. The cutouts 530, 540 form two rings of air poles separating ferromagnetic poles. Thus, a magnetic configuration is achieved similar to that achieved by the embodiment illustrated in FIG. 4, where concentric rings comprise offset salient poles separated by respective air poles 530, 540.

Figure 6:
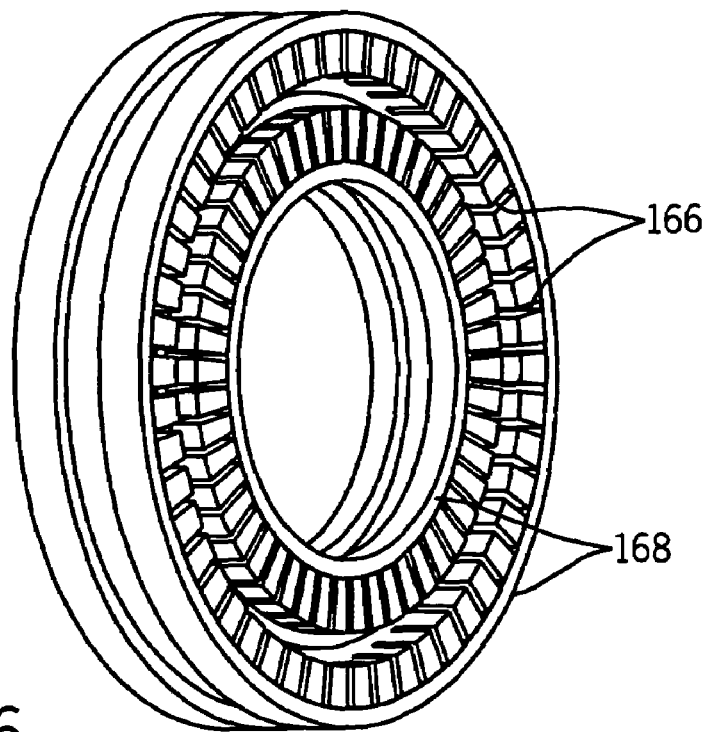
FIG. 6 is a perspective view of an exemplary stator for a machine according to an embodiment of the invention.

FIG. 6 illustrates a three dimensional view of the stator assembly 150 with armature windings 166. The assembly 150 also includes end windings 168. The armature windings may be lap/wave windings. The stator assembly 150 is adapted to be housed between a pair of axially spaced-apart rotor segments, as illustrated in FIG. 1. The stator windings 166 are positioned between stator teeth along the circumferential perimeter on each side of the inner and outer stators.

The above-described methods and apparatus provide a synchronous machine with stationary superconducting field coils. This arrangement allows the cooling fluids to be more easily supplied to the superconducting field coils. Transfer of cooling fluid from a stationary cooling system to a rotating superconducting coil is eliminated. Further, the above-described methods and apparatus provide a motor which generates an axial airgap flux, resulting in improved torque density. Preferably, permanent magnets and DC coils may be omitted from the machine 100.

The present application is related to U.S. patent application Ser. No. 10/444,253, filed May 21, 2003, titled "METHODS AND APPARATUS FOR ASSEMBLING HOMOPOLAR INDUCTOR ALTERNATORS INCLUDING SUPERCONDUCTING WINDINGS," which is incorporated herein by reference in its entirety.

Exemplary embodiments of electrical generating systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:
1. A machine, comprising:
a rotatable rotor assembly comprising a plurality of salient poles; and
a stationary stator assembly comprising concentric inner and outer stators, a stationary superconducting field coil and at least one stator coil, wherein the stationary superconducting field coil is disposed between the inner and outer stators;

wherein the stationary superconducting field coil and the salient poles are configured relative to each other such that when the rotor assembly is rotated relative to the stator assembly around a predetermined axis, a rotating magnetic field is produced with an airgap flux direction substantially along the predetermined axis, and wherein the interaction between the stationary superconducting field coil and the rotating poles provides the only source of a time varying magnetic flux supplied to the stator coil.

2. A machine in accordance with claim 1 wherein the machine comprises a generator.

3. A machine in accordance with claim 1 wherein the machine comprises a motor.

4. A machine in accordance with claim 1 wherein said rotor assembly includes two rotor segments being spaced apart along an axis of rotation and said stator assembly is located between the two rotor segments.

5. A machine in accordance with claim 1 wherein each rotor segment includes a plurality of concentric rings, each ring comprising offset salient poles separated by air poles.

6. A machine in accordance with claim 1 wherein each rotor segment comprises a ferromagnetic base and ferromagnetic portions mounted on said base to form said poles.

7. A machine in accordance with claim 1 wherein each rotor segment comprises a ferromagnetic base comprising cutouts to form air poles separated by ferromagnetic salient poles.

8. A machine in accordance with claim 1 further comprising a plurality of rotor and stator assemblies arranged along an axis of rotation of the rotor assemblies.

9. A machine, comprising
a shaft adapted to rotate about a longitudinal axis of said shaft;
a rotor assembly rotationally engaged with said shaft, said rotor assembly comprising a plurality of salient poles, said salient poles being spaced apart circumferentially; and
a stator assembly comprising concentric inner and outer stators, a plurality of armature windings and a stationary superconducting field coil, wherein the stationary superconducting field coil is located between the inner and outer stators;
wherein the stationary superconducting field coil and the salient poles are configured relative to each other such when the rotor assembly is rotated relative to the stator assembly around a predetermined axis, a rotating magnetic field is produced with an airgap flux direction substantially along the predetermined axis, and wherein the interaction between the stationary superconducting field coil and the rotating poles provides the only source of a time varying magnetic flux supplied to the armature windings.

10. A machine in accordance with claim 9 wherein the machine comprises a generator.

11. A machine in accordance with claim 9 wherein the machine comprises a motor.

12. A machine in accordance with claim 9 wherein said rotor assembly includes two rotor segments being spaced apart along the shaft and said stator assembly is located between the two rotor segments, such that the shaft passes through an opening in the stator assembly.

13. A machine in accordance with claim 9 further comprising a plurality of rotor and stator assemblies arranged along the shaft.

14. A machine in accordance with claim 9 wherein said superconducting field coil is mounted on the inner stator of the stator assembly.

15. A machine in accordance with claim 12 wherein each rotor segment comprises a plurality of concentric rings, each ring comprising offset salient poles separated by air poles.

16. A machine in accordance with claim 15 wherein each rotor segment comprises a ferromagnetic base and ferromagnetic portions mounted on said base to form said poles.

17. A machine in accordance with claim 15 wherein each rotor segment includes a ferromagnetic base comprising cutouts to form air poles separated by ferromagnetic salient poles.

18. A method of generating electricity using a stationary superconducting field coil, which is disposed between concentric inner and outer stators, and at least one stationary stator winding, said method comprising:
providing a current to the stationary superconducting field coil;
rotating a rotor assembly relative to the stationary superconducting field coil such that the stationary superconducting field coil acts as a stationary magnetomotive force (MMF) source which interacts with a rotating permeance wave of rotating poles of the rotor assembly to produce a rotating magnetic field,
wherein the rotating magnetic field has an airgap flux in a direction substantially aligned with an axis of rotation of the rotating magnetic field, and wherein the interaction between the stationary superconducting field coil and the rotating poles provides the only source of a time varying magnetic flux supplied to the stationary stator winding.

19. A method in accordance with claim 18 wherein the rotating magnetic field generates a current in the at least one stationary stator winding.

20. A method in accordance with claim 18 wherein the stationary stator windings are mounted on the inner and outer stators.

21. A method in accordance with claim 18 wherein creating a magnetic field with the stationary superconducting field coil comprises cooling the stationary superconducting field coil to a temperature below its $T_c$ temperature.

22. A method in accordance with claim 18 wherein the rotor assembly includes a pair of rotor segments spaced axially apart, and each rotor segment comprises a plurality of offset salient poles arranged in a plurality of concentric rings.

23. A method in accordance with claim 22 wherein a stator assembly is positioned between the rotor segments.

* * * * *